United States Patent

Cioffi et al.

[11] Patent Number: 5,838,799
[45] Date of Patent: Nov. 17, 1998

[54] DIGITAL SOUND BROADCASTING USING A DEDICATED CONTROL CHANNEL

[75] Inventors: John M. Cioffi, Cupertino; John A. C. Bingham, Palo Alto; Mark P. Mallory, Sunnyvale, all of Calif.

[73] Assignee: Amati Communications Corporation, San Jose, Calif.

[21] Appl. No.: 453,564

[22] Filed: May 26, 1995

Related U.S. Application Data

[63] Continuation of Ser. No. 119,698, Sep. 10, 1993, abandoned.

[51] Int. Cl.$^6$ ................ H04H 5/00; H04H 1/00
[52] U.S. Cl. ................ 381/2; 375/260; 370/524; 370/525; 455/42; 455/102; 455/103
[58] Field of Search ................ 375/260, 261, 375/267; 370/110.1, 110.2, 23, 24, 524, 525; 455/42, 102, 103, 104; 381/2, 3

[56] References Cited

U.S. PATENT DOCUMENTS

| | | | |
|---|---|---|---|
| 4,314,376 | 2/1982 | Williams | 455/310 |
| 4,601,045 | 7/1986 | Lubarsky | 375/38 |
| 4,914,651 | 4/1990 | Lusignan | 370/110.1 |
| 5,148,272 | 9/1992 | Acampora et al. | 370/110.1 |
| 5,289,496 | 2/1994 | Nakagawa et al. | 375/1 |
| 5,291,289 | 3/1994 | Hulyalkar | 375/39 |
| 5,293,633 | 3/1994 | Robbins | 375/17 |

OTHER PUBLICATIONS

"Digital Sound Broadcast with Auxiliary Overhead Control", NAB 1993 Broadcast Engineering Conference Proceedings, pp. 243–248.

*Primary Examiner*—Wellington Chin
*Assistant Examiner*—Jean B. Corrielus
*Attorney, Agent, or Firm*—Hickman Beyer & Weaver

[57] ABSTRACT

A method and apparatus for transmitting digital sound is disclosed. The method contemplates transmitting a digital radio signal (such as an FM band signal) over a plurality of sub-channels subject to some constraints on the digital signal power. A control sub-channel, sometimes referred to as an auxiliary overhead channel is used to transmit control information which is interpreted by the receiver to identify the location and potentially the mode of the digital signals.

31 Claims, 4 Drawing Sheets

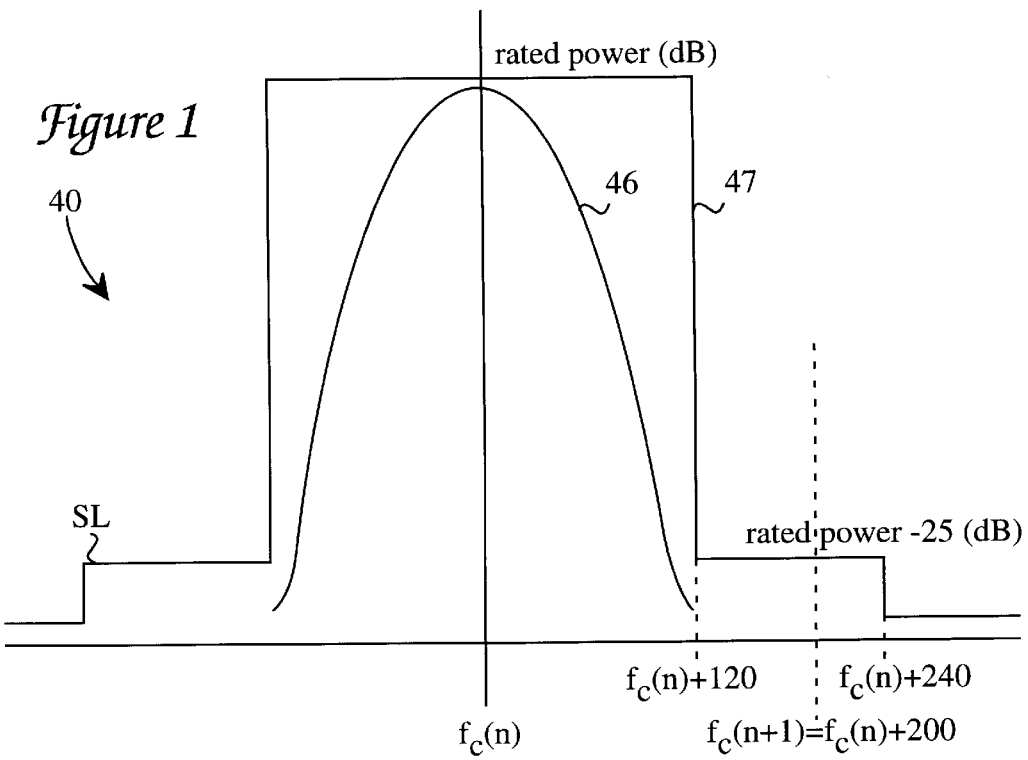
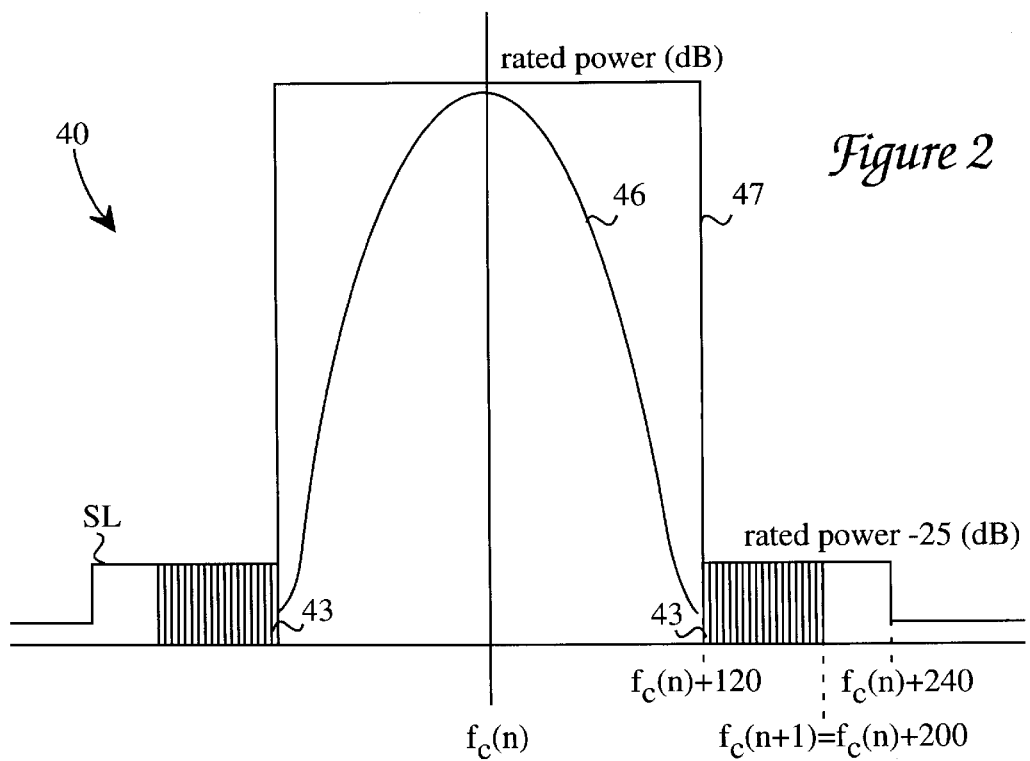

DIGITAL SOUND BROADCASTING USING A DEDICATED CONTROL CHANNEL

This is a continuation of application Ser. No. 08/119,698 filed Sep. 10, 1993, now abandoned.

BACKGROUND OF THE INVENTION

The present invention relates generally to radio broadcasts suitable for transmitting digital quality sound. In one particularly advantageous application a digital quality sound transmission scheme for FM radio programs is described that may be overlaid about analog FM radio broadcasts.

In the United States, the Federal Communications Commission (FCC) is charged with the responsibility of regulating radio broadcasts. Presently, one of the most important radio broadcast bands for commercial applications is the FM radio frequency spectrum. The most common users of the FM frequency band are commercial and non-profit radio stations, which broadcast audio news, music, entertainment, advertising and the like. Currently substantially all FM radio broadcasts transmit analog audio signals. While analog FM audio signals have worked well in the past, in many market areas, the FM broadcast spectrum is relatively full. Further, with the widespread acceptance of compact discs (CDs), listeners have become accustomed to higher quality sound, which is for the most part unavailable using analog FM audio signal. Accordingly, there has recently been a great deal of interest in standardizing a system that supports the transmission of Digital Sound Broadcast (DSB) in the existing FM radio frequency spectrum.

Digital Sound Broadcast offers the potential of a wide variety of new broadcast services. The application that is probably closest to deployment in the United States is the transmission of compact disc (CD) quality compressed audio signals in FM radio markets. Other possible applications include digital information services, message services, and even the transmission of medium quality video signals. Since there is currently a large installed base of analog FM radio broadcasting stations, it is highly desirable that any digital sound broadcast scheme be backward compatible with existing analog equipment. This would allow current listeners to continue to use their old radio equipment, while new products can make use of the higher quality sound available using digital signal transmissions.

To date there have been several proposed Digital Sound Broadcast schemes proposed. By way of example, a modulation method called discrete multi-tone modulation (also called Coded Orthogonal Frequency Division Multiplexing (COFDM)) has received widespread interest. However, the schemes that have been proposed to date tend to lack the flexibility to permit a user to offer a wide variety of digital broadcast services.

As seen in FIG. 1, the FCC's current regulation require that FM carrier signal frequency centers ($f_c$) be separated by at least 200 kHz. Normally, they are separated by at least 400 kHz, although in some market areas (particularly along the eastern seaboard), the number of licensed stations in a given area may dictate a 200 kHz spacing between some stations. The FCC requires that the broadcast signal from each station must fall within the signal strength mask as shown in FIG. 1. In essence, the combined signal strength in the range of the center frequency ($f_c$) plus or minus 120 kHz may not exceed an approved signal strength (which may vary from station to station). Further, the broadcast is permitted to spill over into adjacent frequencies to a certain degree. Specifically, the combined signal strength in the range of the frequency center plus 120 kHz to the frequency center plus 240 kHz and the frequency center minus 120 kHz to the frequency center minus 240 kHz [i.e. the magnitude of the signals in the range of: ($f_c$−240 to $f_c$−120) and the magnitude of the signals in the range of: ($f_c$+120 to $f_c$+240)] must not exceed a combined strength that is 25 dB below the station's approved signal strength. These lower approved signal strength regions (marked SL in the drawings) are referred to herein as the "sidelobes" of the signal strength mask.

SUMMARY OF THE INVENTION

In view of the foregoing, it is an object of the present invention to provide a flexible structure for transmitting digital sound broadcasts that facilitates both backward compatibility with existing analog broadcast transmissions and future expandability to permit the addition of a variety of digital broadcast services.

To achieve the foregoing and other objects and in accordance with the purpose of the present invention, an improved method of transmitting digital sound is disclosed. The method is particularly well adapted for transmissions in the FM radio band although it could be applied to other frequency spectrums as well. The method contemplates transmitting a multi-tone digital radio signal (such as an FM band signal) over a plurality of sub-channels conforming to a predefined signal strength mask. A control sub-channels (which is referred to herein as an auxiliary overhead channel) is used to carry control information which is interpreted by the receiver to identify the location and potentially the mode of the digital signals. Of course, additional control information could be provided as well.

In one preferred application of the described arrangement, the digital signals are overlaid on a conventional analog FM radio signal. In this application, the digital signals may be used to transmit CD-quality digital signals that correspond to the audio signals transmitted via the conventional analog carrier. In other applications, the digital signals may carry any of a variety of other digital broadcast services.

In another specific preferred embodiment of the invention, the overlaid digital signals may be located on opposite sides of a base analog signal in a region that includes at least a portion of the sidelobes of the approved signal strength mask for the station transmitting the signals. This arrangement is particularly appropriate in situations where there is an interfering station separation of at least 400 kHz on each side of the station's frequency center. If there is only a 200 kHz separation on one side of the station's frequency center, then an arrangement wherein the overlaid digital signals are located on only the other side of the base analog signal is typically more appropriate.

In another preferred embodiment of the invention, the control information is transmitted as a continuous string of frames wherein each frame includes a signature identifying the frame as a portion of the control signal. The frames (either individually or in combination) also carry information sufficient to enable a receiver to identify the sub-channels used to carry the digital radio signal. This may include a command that indicates the transmission mode that is in use to transmit the digital radio signal.

In alternative aspects of the invention, transmitter and receiver designs that are particularly well suited for digital broadcasting are disclosed. The transmitter includes an encoder for encoding a digital audio signal into a compressed digital signal suitable for transmission as part of a multi-carrier signal transmitted over a plurality of sub-channels, wherein each sub-channel has a designated frequency band. An arrangement is also provided for applying a control signal to at least one of the sub-channels. As indicated above, the control signal is arranged to provide information indicative of the frequency bands used to transmit the compressed digital signal. A modulator is also provided for transmitting the multi-carrier signal as a radio signal.

The receiver includes a receiving unit capable of receiving a digital radio signal having a plurality of sub-channels wherein each sub-channel has a designated frequency band. The sub-channels include a designated control sub-channel that carries a control signal that is arranged to provide information indicative of the frequency bands used to transmit the digital radio signal. A controller is provided for interpreting the control signal and a decoder is provided for decoding the digital radio signal based upon the information interpreted by the controller.

In one preferred embodiment of the transmitter the encoder includes a forward error correction encoder, a differential PSK decoder and an inverse fast Fourier transform (IFFT) encoder. In a corresponding embodiment of the receiver, the decoder includes a fast Fourier transform (FFT) decoder, a differential PSK decoder and a forward error correction decoder.

BRIEF DESCRIPTION OF THE DRAWINGS

The invention, together with further objects and advantages thereof, may best be understood by reference to the following description taken in conjunction with the accompanying drawings in which:

FIG. 1 is a diagrammatic illustration of the signal strength mask that a FM radio signal must fall within according the Federal Communication Commission's regulations.

FIG. 2 is a diagrammatic illustration of a multi-sub-channel digital signal that is overlaid onto an analog FM broadcast signal and includes a pair of control channels in accordance with the present invention.

DETAILED DESCRIPTION OF THE INVENTION

The present invention contemplates the use of a control sub-channel as part of a multi-carrier compressed digital signal broadcast in existing radio frequency bands. The control sub-channel is intended to provide control information indicative of the frequency bands (sub-channels) at which particular signals are transmitted. The inventors have discussed the concept of a control sub-channel (frequently referred to as an "Auxiliary Overhead Channel" (AOC)) in a paper entitled Digital Sound Broadcast with Auxiliary Overhead Control" which was published as part of the NAB 1993 Broadcast Engineering Conference Proceedings, pp. 243–248 and which is incorporated herein by reference.

In the first described embodiment, the invention is applied to FM radio broadcast signals having a minimum 400 kHz carrier separation on at least one side of the primary carrier frequency. The digital signal is overlaid over a traditional analog FM broadcast signal. In alternative described embodiments, the analog sub-channel may be replaced with multiple sub-channels suitable for transmitting compressed digital signals.

Figure 3:
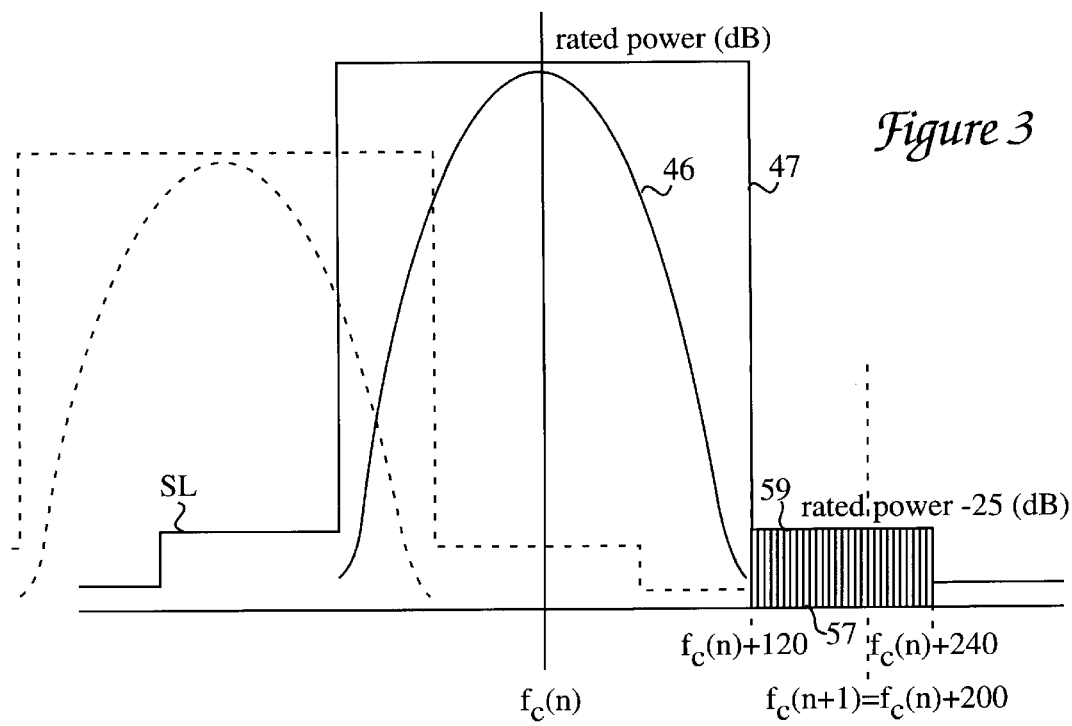
FIG. 3 is a diagrammatic illustration of an alternative multi-carrier digital signal that is overlaid onto an analog FM broadcast signal on just one frequency side of the analog signal and includes a control channel in accordance with the present invention.
Figure 4:
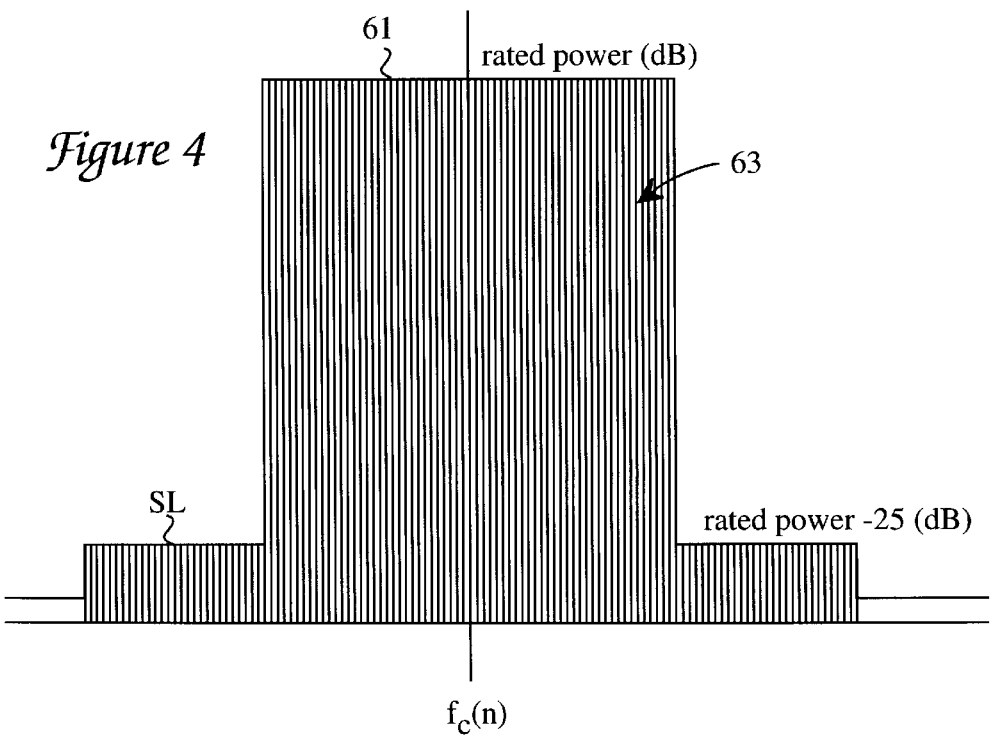
FIG. 4 is a diagrammatic illustration of a multi-subchannel digital signal that is transmitted within the primary strength envelope of an existing FM radio signal mask and includes a control channel in accordance with the present invention.

As seen in FIGS. 2–4, one proposed transmission scheme contemplates the transmission of digital signals over a plurality of sub-channels 43 that fall within an approved carrier signal strength mask 40. For example, in the embodiment shown in FIG. 2, a conventional analog carrier signal 46 is transmitted on a base channel 47 having a bandwidth of approximately 200 kHz centered at the channel's frequency center. A total of 36 sub-channels are provided in the sidelobes of the carrier band. More specifically, a total of 18 sub-channels are provided in each sidelobe (SL). The sub-channels each have a bandwidth of 4.3125 kHz and are arranged adjacent one another in the range of $f_c$–190 kHz to $f_c$–110 kHz and $f_c$+110 kHz to $f_c$+190 kHz. It should be appreciated that the number of actual sub-channels, as well as the actual locations and bandwidths of the various sub-channels are not critical to the invention. Rather, the number of sub-channels, their respective bandwidths, and their respective frequency locations may all be widely varied in accordance with the needs of a particular broadcast system. Indeed, it is not even required that the sub-channels used to carry the digital signals be located within the sidelobes. Rather, when the nature of the analog signal permits, some (or even all) of the digital signals may be transmitted on sub-carriers located within the maximum strength central portion of the signal strength mask 40.

In one proposed arrangement, the sub-channels 43 are used to transmit digital audio signals that correspond to the analog signal transmitted by the base carrier 46. Various data compression methods for a digital stereophonic audio signals having a data rate of between 128 and 160 kbps are known to achieve excellent quality. To protect the compressed audio against the inevitable transmission errors, forward error correction is highly recommended. When forward error correction is used, the required data rate for a single digital audio signal may (by way of example) be in the range of 192 and 240 kbps. Of course, compression techniques for particular applications and improvements in compression technology may cause the actual desired data rates to vary well beyond these boundaries.

In the usual case, interfering stations will be separated by at least 400 kHz. In such a case, the digital sound broadcast signal can use both of the sidelobes. The bandwidth of the sidelobes that are used may be varied in accordance with the needs of a particular system. By way of example, in the U.S., frequency ranges in the neighborhood of $f_c$–190 kHz to $f_c$–110 kHz and $f_c$+110 kHz to $f_c$+190 kHz have been found to work well. With the described bandwidth of approximately 4.3 kHz per sub-channel, this would provide 18 sub-channels in each side lobe. When one of the sub-channels in each side lobe is used as the control channel 27 and a separate pilot sub-channel 28 is used to transmit a pilot tone, the system has sufficient bandwidth to transmit 160 kbps digital stereophonic audio signals even after forward error correction.

In some situations, an interfering station may be separated by only 200 kHz. If this is the case, it is typically impractical to make much use of the sidelobe that extends into the frequency range of the adjacent station since such signals would be drowned out by the adjacent station. Accordingly, in such cases, the adjacent analog FM signal may force the digital signal to occupy only the sidelobe on the other side of the carrier. This type of half-channel transmission increases the desirability of lower compressed audio rates such as 128 kbps. With this reduced data rate, a forward error corrected signal can be transmitted over 26 sub-channels. When a control channel 57 and a pilot channel 58 are added, a total of 28 sub-channels may be provided within a single sidelobe as seen in FIG. 3. It should be appreciated that this would require a somewhat broader bandwidth of closer to 120 kHz with the described bandwidth of 4.3 kHz per sub-channel.

Since the existence and location of adjacent (potentially interfering) stations will vary with geographic location, it is important that the receiver be able to discern the location of the digital signals. The control channels 57 are used to transmit control information indicative of the location of the other sub-channels. Although a single sub-channel could readily transmit all of the information necessary, it may be desirable to have redundant control channels which are located on opposite sides of the analog signal so that the control information is less likely to be lost due to interference from adjoining stations. Of course, the actual location of the control channels can be widely varied. Generally, however, it would be located within the central region of each side lobe, where it would be less susceptible to interference.

The described control channels 57 may be used in conjunction with any modulation techniques that has the flexibility to permit the use of whatever bandwidth is available.

Of course, the amount of digital information that can be transmitted would be greatly increased if frequencies in the central region of the signal strength mask were not used to transmit conventional analog audio signals. For example, as seen in FIG. 4, a multiplicity of higher power sub-channels 61 could be provided within the central region 63 of the signal strength mask. With this arrangement substantially more information can be transmitted over a specific FCC approved channel.

The described control channel is used to communicate control information concerning the frequency of the sub-carriers that are used to transmit digital information. The control information is then used by the receiver to extract the digital signal. For example, the control channel might be used to indicate whether one or both of the sidelobes are being used to transmit digital broadcast signals that are overlaid about an analog signal. If the data transmission rates are standardized to permit transmission at fixed data rates over predefined standardized sub-channels as discussed above, then the control signal carried on the control channel can be very simple in nature. For example, an indication of only whether one side lobe or two side lobes are in use. This implementation is particularly well adapted for the transmission of CD-quality digital audio sound in combination with an analog signal. When the location and bandwidth of the sub-channels is standardized, the receiver only needs to be informed as to whether the digital signal is being transmitted over sub-channels located on both sides of the analog signal or is being transmitted over sub-channels within a single sidelobe. Once the receiver has received and interpreted this information, the signals transmitted on the sub-carriers can readily be interpreted. In such a standardized system, it may also be desirable to stipulate that discrete control channels be provided within each side lobe so that if interfering signals block one of the control channels, the other may be available.

In some implementations, the control channel (or control channels) can be dedicated channels that transmit only control information. In others, the control channel may multiplex the control information with other signals. One of the most obvious candidates for multiplexing would be to combine the pilot signal often used in discrete multi-tone modulation techniques with the control information. The control channel does not need to be positioned at a fixed location. Rather, if desired, the control channel could be provided at a random location and a scanning technique could be used to identify the appropriate sub-channel.

In many embodiments, the control information could be much more extensive than the first described implementation. For example, if the relative positioning of the sub-carriers used to transmit the digital signals is not standardized, the control channel may be used to identify the specific sub-carriers used to transmit a particular digital signal. Alternatively, if the sub-channels have variable bandwidths, the control channel could be used to identify the bandwidths and locations of the various sub-channels that are in use.

A suitable protocol for the control channel will be described next. In the described embodiment, each control channel has an 8 kbps data stream using 2-bit signaling (sometimes referred to as QPSK signaling). The signal stream is divided into frames that are 16 ms long, which provides for a frame rate of 62.5 frames per second. Each frame consists of 64 bits (eight bytes). The first two bytes of the frame are the control channel's signature bits and are transmitted with each frame in order to identify the control channel. The next eight bits make up a command byte. Therefore, it would be possible to implement up to 256 receiver commands, although the use of that many receiver commands is not anticipated. The next five bytes are available to transmit other information that is required to interpret or implement a particular command. Alternatively, the remaining bytes may be used to transmit separate information.

By way of example, one command may indicate a normal simulcast wherein the digital signal is overlaid on an analog signal at the default distribution as seen in FIG. 2. The following byte may then indicate the number of bits used on the non-control carriers. A second command may indicate that the signals may only be transmitted on one side of the analog signal as illustrated in FIG. 3. Again, the following byte could then be used to indicate the number of bits transmitted on each non-control carrier. A third command may indicate that only digital signals are transmitted as illustrated in FIG. 4. Once again, the following byte can be used to indicate the number of bits transmitted on the other carriers. A fourth and further commands may indicate that other adjacent channels are to be used for digital transmission. When adjacent channels are available (which they are in many regions of the U.S.), this arrangement could permit the transmission of full strength digital signals which would potentially significantly increase the range of the digital signals. The ability to indicate the use of adjacent (or even remote) channels to transmit digital information is potentially a very powerful use of the auxiliary overhead channel.

Another receiver command may instruct the receiver to enter a variable mode, where the indices of the sub-channels used are specified in order. Additionally, an indication of the number of bits transmitted on each channel may also be provided. Yet another receiver command may set the bounds of the sub-channels used for transmission. That is, it may indicate the indices of the low and high frequency sub-channel that are used below the base carrier and also the indices of the low and high frequency sub-channels that are used above the base carrier. With this arrangement the receiver will assume that all of the sub-channels between the designated low and high frequency sub-channels are in use. With this arrangement, the four bytes that follow the command byte may be used to indicate the indices of the bounding sub-channels. The last byte can then be used to indicate the number of bits used on the non-control carriers.

The commands can also include instructions as to how to demultiplex the signals. For example, a command may be arranged to indicate that a digital sound signal having 192 kbps raw data is being transmitted. With such a command, the next byte could indicate the lowest sub-channel index which contains the primary digital sound signal. The remainder of the digital sound broadcast could then be assumed to sequentially occupy the next higher sub-channels until the entire digital sound signal is transmitted. Alternatively, the following two bytes could be used to specify the lowest sub-channel index and the number of sub-channels used by the corresponding broadcast.

It should be appreciated that a wide variety of other commands (together with their associated control data) can be developed as well. For example, in situations where the analog signal can be removed, one potential application is to use various sub-carriers to transmit different information. For example, it may be desirable to simultaneously transmit bilingual signals, program listings and/or a wide variety of other services over separate sub-carriers within an FCC approved channel. In such cases, control commands can be provided that identify the existence of multiple separate transmission and the following control data can identify the location of each.

In the event that a particular FM station has potentially interfering stations on both sides, a command could be provided to inform the receiver's tuner to move to a different carrier frequency where the digital information is available (either in the single channel per carrier mode or perhaps even multiplexed with another station's digital data). With this arrangement, the power limitations necessarily imposed by limiting the digital signals to transmission over sub-carriers located in the sidelobes can be eliminated.

In another alternative embodiment, the control channels 27 may be arranged to multiplex the pilot signal used to synchronize the receiver with the transmitter with the control information. It should be appreciated to those skilled in the art that in most digital broadcast transmission schemes, it is important to provide a pilot signal to synchronize the receiver with the transmitter. As with the control channel, it may be desirable to transmit repetitive pilot signals when the pilot signal is being transmitted in one of the sidelobes. In any event, since the pilot signal is normally a constant signal, when the control channel is arranged to transmit a relatively small amount of information, it would be possible to multiplex the control and pilot signals on a single sub-carrier.

Figure 5:
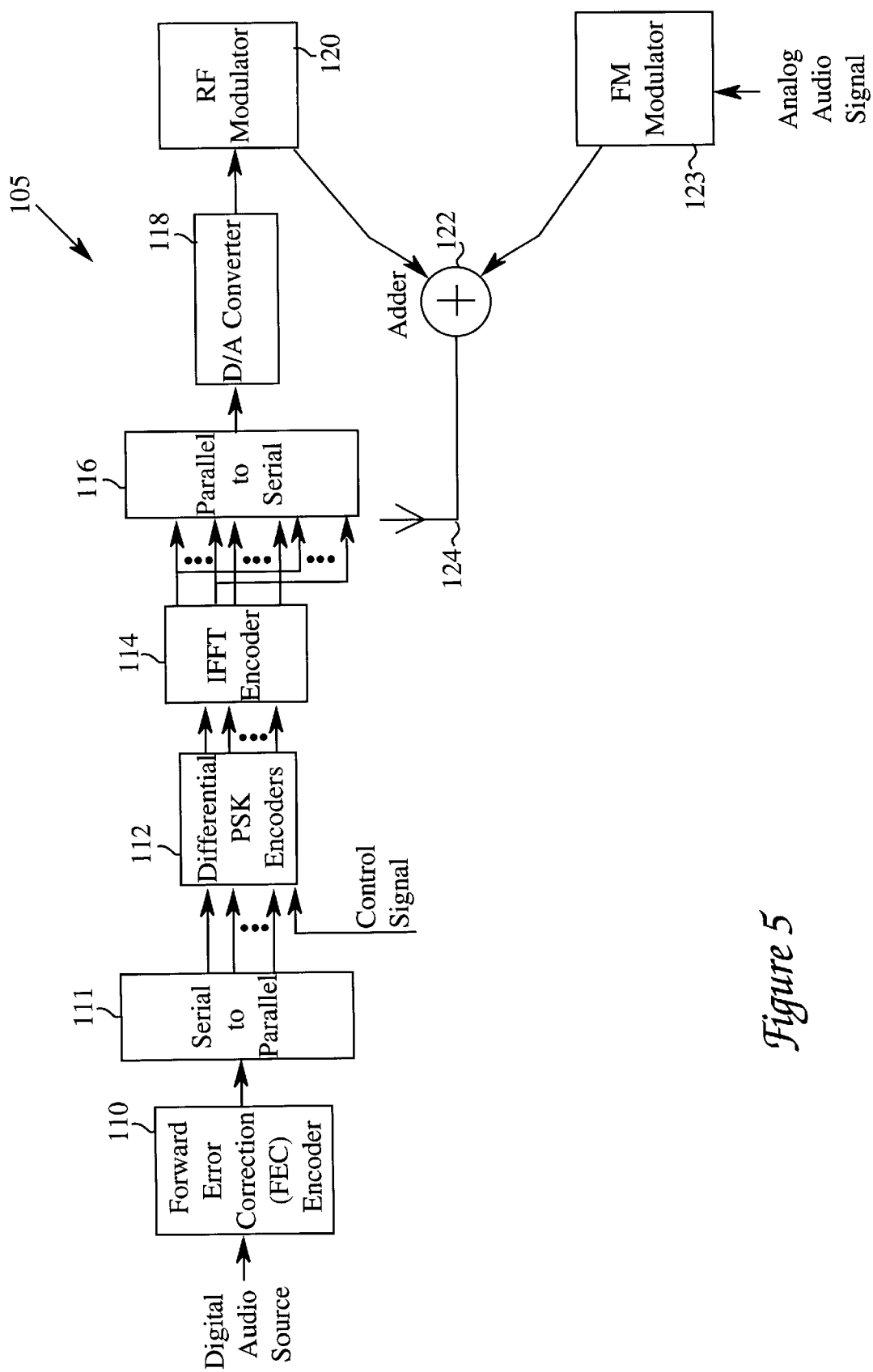
FIG. 5 is a block diagram of a transmitter suitable for transmitting digital signals utilizing a plurality of sub-channels including a control channel in accordance with the present invention.

Referring next to FIG. 5, a transmitter 105 suitable for transmitting digital signals utilizing a control channel in accordance with the present invention will be described. As seen therein, the transmitter receives a signal from a digital audio source. The source may be a digital encoder that converts an analog source, or come directly from a digital recording media such as a compact disc. The digital audio source is received by a forward error corrector 110, which encodes the signal with forward error correction in order to help insure that the inevitable minor transmission errors will not ruin the quality of the received sound. The forward error corrected signal is passed to a Serial to Parallel converter 111 which in turn feeds a differential phase shift keying (PSK) encoder 112 which divides the signal into blocks of data that are to be transmitted on a multiplicity of sub-carriers. In the embodiment described above, a separation of 4.3 kHz would be appropriate. By way of example, a suitable PSK encoder is described in J. Bingham's text entitled "Theory and Practice of Modem Design" published by J. Wiley & Sons (1988), which is incorporated herein by reference. In the described example, the control signal is also inputted to the PSK encoder, although it should be appreciated that it could alternatively be added at other locations as well.

From the PSK encoder 112, the signal is passed to an inverse fast Fourier transform (IFFT) encoder 114 which converts frequency domain signals to the time domain. A suitable IFFT encoder is described in J. Bingham's article entitled: "Multicarrier Modulation: An Idea Whose Time Has Come," IEEE Communication Magazine, May 1990. From the IFFT encoder, the signal is passed to a parallel to serial converter with a prefix inserter 116 which adds a cyclic prefix to the signal. By way of example, in a signal having 512 samples, a 40 sample cyclic prefix has been found to work well. From the prefix inserter 116, the signal is passed to a digital to analog converter 118, an RF modulator 120, an adder 122 and an antenna 124. The adder is used to combine the digital RF signal with a conventional analog RF signal. Of course, in systems that transmit only digital signals, the adder 122 and its associated FM modulator 123 can be eliminated. In the described embodiment, the FM modulator 123 is a conventional FM system that modulates an analog audio signal.

Figure 6:
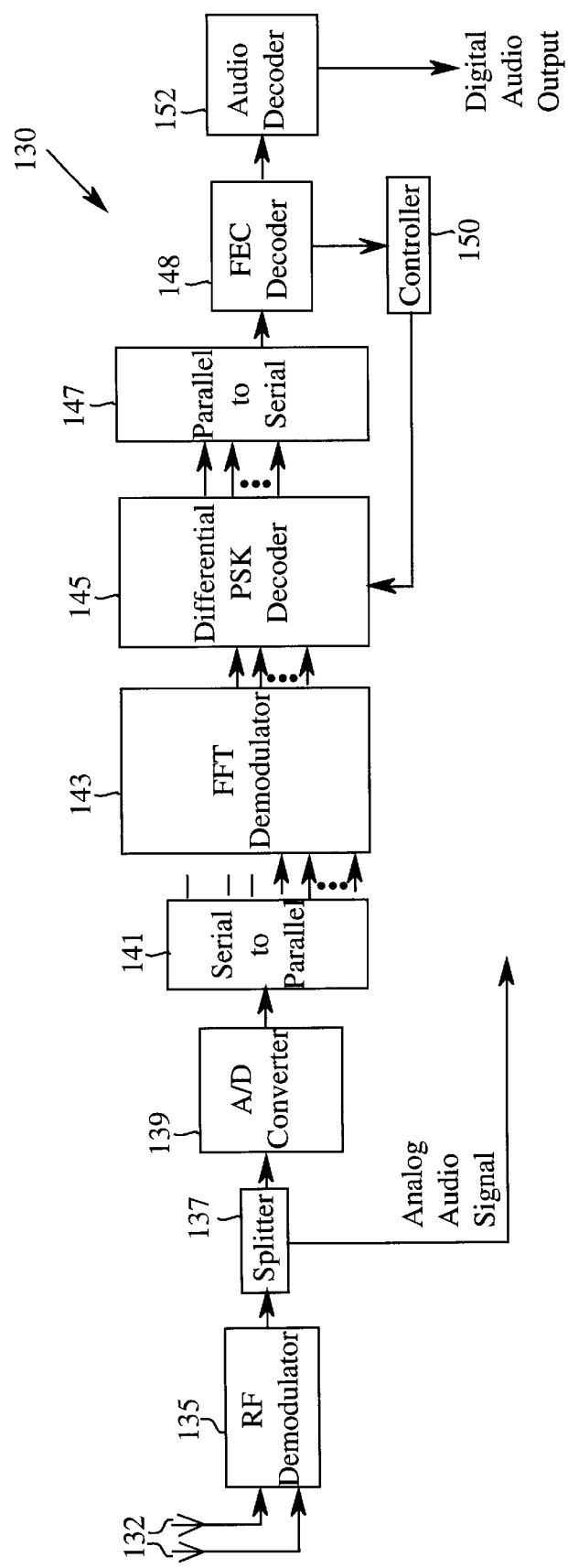
FIG. 6 is a block diagram of a receiver suitable for receiving digital signals transmitted over a plurality of sub-channels and including a control channel.

Referring next to FIG. 6, a receiver 130 suitable for receiving digital signals transmitted by the transmitter 105 utilizing a control channel in accordance with the present invention will be described. As seen therein, the receiver 130 receives an FM signal from an antenna 132. The signal is first passed to an RF demodulator 135 that demodulates the RF signal and then to a splitter 137 that separates out any analog signals. The digital signals are passed from the splitter 137 to an analog to digital converter 139 and on to a serial to parallel converter 141 that also strips out the cyclic prefix. The serial to parallel converter 141 passes parallel signals to an fast Fourier (FFT) decoder 143 which complements the IFFT encoder 114. Thus, the FFT decoder 143 converts the time domain signal back into the frequency domain. A suitable FFT decoder is also described in the article cited above.

From the FFT decoder 143, the signal is passed to a multiplicity of differential PSK decoders 145 which decode the signals in each of the sub-channels. The differential PSK decoders 145 complement the differential PSK encoders 112. From the differential PSK decoders 145, the signals are passed to a parallel to serial converter 147 and the combined signal is then passed on to a forward error correction (FEC) decoder 148, which removes the forward error correction information. A controller 150 reads the information transmitted over the control channel and provides feedback to the differential PSK decoder 145 accordingly so that the digital signals are read properly. More specifically, the controller 150 informs the PSK demodulator which FFT points correspond to which sub-channels. The output of the forward error correction decoder is passed through an audio decoder 152 which outputs digital audio sound. When the digital audio output corresponds to the analog output, it may be desirable for the receiver to disregard the analog output. On the other hand, when the output are distinct, it is possible that either could be used independently, or in some cases could even be multiplexed.

Although only a few embodiments of the present invention have been described herein, it should be understood that the present invention may be embodied in many other specific forms without departing from the spirit or scope of the invention. Particularly, the invention relates to the use of a control sub-channel and accordingly, the actual compression, error correction and encoding techniques described may be varied widely. Further, the control channels may be dedicated to transmitting control signals or may multiplex the control signals with simple information such as a pilot signal. The digital information may be transmitted only in the sidelobes of a FCC approved signal strength mask, in both the central region 63 of the signal strength mask and the sidelobes, or strictly in the central region 63 depending upon the needs of a system. Further, the described technique can be used both independently to transmit digital signals only or to overlay digital signals about a conventional analog signal.

A wide variety of transmitter and receivers can be used in conjunction with the present invention as well. The arrangement is also independent of the information transmitted. Thus, the described system can be used to transmit audio information, video information or data in any form, including any combination of the foregoing. In view of the foregoing, the present examples are to be considered as illustrative and not restrictive, and the invention is not to be limited to the details given herein, but may be modified within the scope of the appended claims.

We claim:

1. A method of transmitting digital sound by frequency modulation using carrier frequencies in an FM radio band of frequencies, said FM radio band of frequencies being organized into a plurality of FM radio band signal strength masks, each of said FM radio band signal strength masks having a central portion and two sidelobe portions, the method comprising the steps of:

transmitting a discrete multi-tone digital FM band radio audio signal in parallel over a first plurality of sub-channels, said discrete multi-tone digital FM band radio audio signal representing a content of said digital sound, said first plurality of sub-channels representing a subset of available sub-channels within a first FM radio band signal strength mask of said FM radio band signal strength masks, said available sub-channels being located in one of said central portion of said first FM radio signal strength mask that is unoccupied by an analog audio signal and at least one of said two sidelobe portions of said first FM radio signal strength mask that is nonoverlapped by two immediately adjacent FM radio band signal strength masks of said plurality of FM radio band signal strength masks; and transmitting a control signal on a control sub-channel, said control sub-channel representing a sub-channel of said available sub-channels that is different from said first plurality of sub-channels, the control signal containing information for decoding the discrete multi-tone digital FM band radio signal upon reception by a receiver including information indicative of the number of sub-channels that carry the discrete multi-tone digital radio audio signal as well as their location in the FM radio band of frequencies.

2. A method as recited in claim 1 wherein the control signal is transmitted on a dedicated control sub-channel that carries only control information.

3. A method as recited in claim 2 wherein the control signal is multiplexed with a pilot signal.

4. A method as recited in claim 2 wherein a redundant control signal is transmitted on a second dedicated control sub-channel.

5. A method as recited in claim 1 wherein a redundant control signal is transmitted on a second control sub-channel.

6. A method as recited in claim 5 wherein the first control sub-channel is located at a frequency that is higher than a base carrier frequency and the second control sub-channel is located at a second frequency that is lower than the base carrier frequency.

7. A method as recited in claim 1 wherein a plurality of the sub-channels are used to transmit video data signals.

8. A method as recited in claim 1 wherein a plurality of the sub-channels are used to transmit bilingual broadcasts of a program.

9. A method as recited in claim 1 wherein a plurality of the sub-channels are used to transmit auxiliary digital data signals.

10. A method as recited in claim 1 wherein the control signal is transmitted as a continuous string of frames.

11. A method as recited in claim 10 wherein a signature identifying each frame as a portion of the control signal is transmitted with each frame.

12. A method as recited in claim 10 wherein each frame further includes a command that indicates a transmission mode which is in use to transmit the digital radio signal.

13. A method as recited in claim 1 wherein the receiver scans sub-channels within two sidelobe portions to locate the control sub-channel.

14. A method of transmitting digital sound by frequency modulation using carrier frequencies in an FM band of frequencies, the method comprising the steps of:

transmitting an analog FM radio signal over a single designated FCC approved FM channel having a signal strength mask for a single carrier with a pair of sidelobes;

transmitting a discrete multi-tone digital FM band radio signal over a plurality of transmission sub-channels within the designated FCC approved FM signal strength mask wherein said plurality of transmission sub-channels being located on a sidelobe of said signal strength mask that is nonoverlapped by an immediately adjacent FCC approved FM channel; and transmitting a control signal on a control sub-channel, the control signal containing information for decoding the discrete multi-tone digital FM band radio signal upon reception by a receiver, the control sub-channel being located in one of the sidelobes of the signal strength mask.

15. A method as recited in claim 14 wherein a plurality of the transmission sub-channels, are used to transmit compact disc quality digital audio signals.

16. A method as recited in claim 14 wherein carrier frequencies for the plurality of transmission sub-channels are chosen to avoid a principle frequency band occupied by the analog FM signal.

17. A method as recited in claim 16 wherein a plurality of the sub-channels are used to transmit digital audio data signals that correspond to the analog FM radio signal.

18. A method of transmitting digital sound by frequency modulation using carrier frequencies in an FM band of frequencies, said FM band of frequencies being organized into a plurality of FM radio band signal strength masks, each of said FM radio band signal strength masks having a central portion and two sidelobe portions, the method comprising the steps of:

transmitting a discrete multi-tone digital FM band radio audio signal in parallel over a first plurality of sub-channels, said discrete multi-tone digital FM band radio audio signal representing a content of said digital sound, said first plurality of sub-channels representing a subset of available sub-channels within a first FM radio band signal strength mask of said FM radio band signal strength masks said available sub-channels being located in one of said central portion of said first FM radio signal strength mask that is unoccupied by an analog audio signal and at least one of said two sidelobe portions of said first FM radio signal strength mask that is nonoverlapped by two immediately adjacent FM radio band signal strength masks of said plurality of FM radio band signal strength masks, and transmitting control information on a control signal over a control sub-channel, said control sub-channel representing a sub-channel of said available sub-channels that is different from said first plurality of sub-channels, the control information being transmitted as a continuous string of frames wherein each frame includes a signature identifying the frame as a portion of the control signal and control data to enable a receiver to identify the plurality of sub-channels used to carry the discrete multi-tone digital FM band radio audio signal.

19. A method as recited in claim 18 wherein each frame further includes a command that indicates a transmission mode which is in use to transmit the digital radio signal.

20. A method as recited in claim 19 wherein the control sub-channel is a dedicated control sub-channel that carries only the control information.

21. A method as recited in claim 18 wherein the control signal indicates the number of sub-channels that carry the digital radio signal and an indicia that identifies a location of a first one of the plurality of sub-channels.

22. A digital radio signal receiver comprising:
means for receiving a discrete multi-tone digital radio signal in the FM frequency band, the digital radio audio signal being transmitted in parallel using a plurality of subcarriers each having an associated sub-channel within a designated portion of a FM radio band signal strength mask having a central portion and two sidelobe portions, said designated portion being one of said central portion that is unoccupied by an analog audio signal and one of said two sidelobe portions that is nonoverlapped by two immediately adjacent FM radio band signal strength masks of said FM frequency band;
means for interpreting a control signal received on at least one control sub-channel, wherein the control signal provides information indicative of frequency bands used to transmit the digital radio audio signal and the number of sub-channels used to carry the digital radio audio signal; and
means for decoding the digital radio audio signal based upon the information interpreted by the control signal interpreting means.

23. A digital radio signal receiver as received in claim 22 wherein the control signal interpreting means includes a controller that identifies a control sub-channel that contains the control signal and determines the frequency bands that carry the digital radio signal based on the information included in the control signal.

24. A digital radio signal receiver as recited in claim 22 wherein the receiving means includes an RF demodulator.

25. A digital radio signal receiver as recited in claim 22 wherein the decoding means includes a Fast Fourier Transform (FFT) decoder, a differential PSK decoder and a forward error correction decoder.

26. A digital radio signal transmitter comprising:
encoding means for encoding a digital audio signal into a compressed discrete multi-tone signal to be transmitted as part of a multi-carrier signal transmitted in parallel over a plurality of sub-channels within a designated portion of a FM radio band signal strength mask having a central portion and two sidelobe portions, said designated portion being one of a central portion that is unoccupied by an analog audio signal and a sidelobe portion that is nonoverlapped by two immediately adjacent stations, wherein each sub-channel having a designated frequency band;
means for applying a control signal to a control sub-channel having a designated frequency band in the FM radio frequency band, the control signal providing information indicative of the frequency bands used to transmit the compressed digital signal; and
means for transmitting the discrete multi-tone digital signal and the control signal as a radio signal in the FM radio frequency band.

27. A digital radio signal transmitter as recited in claim 26 wherein the control signal applying means applies the control signal to a dedicated control sub-channel.

28. A digital radio signal transmitter as recited in claim 26 wherein the transmitting means includes an RF modulator.

29. A digital radio signal transmitter as recited in claim 26 wherein the encoding means includes a forward error correction encoder, a differential PSK decoder and an inverse fast Fourier transform (IFFT) encoder.

30. A method of transmitting digital sound by frequency modulation using carrier frequencies in an FM radio band of frequencies, said FM radio band of frequencies being organized into a plurality of FM radio band signal strength masks, each of said FM radio band signal strength masks having a central portion and two sidelobe portions, the method comprising the steps of:
transmitting a discrete multi-tone digital FM band radio signal in parallel over a first plurality of sub-channels, said discrete multi-tone digital FM band radio signal representing a content of said digital sound, said first plurality of sub-channels representing a subset of available sub-channels within a first FM radio band signal strength mask of said FM radio band signal strength masks, said available sub-channels being located in one of said central portion of said first FM radio signal strength mask that is unoccupied by an analog audio signal and at least one of said two sidelobe portions of said first FM radio signal strength mask that is nonoverlapped by two immediately adjacent FM radio band signal strength masks of said plurality of FM radio band signal strength masks; and
transmitting a control signal on a control sub-channel, said control sub-channel representing a sub-channel of said available sub-channels that is different from said first plurality of sub-channels, the control signal containing information for decoding the discrete multi-tone digital FM band radio signal upon reception by a receiver including information indicative of the number of sub-channels that carry the discrete multi-tone digital radio signal as well as their location in the FM radio band of frequencies.

31. A method of transmitting digital sound by frequency modulation using carrier frequencies in an FM band of frequencies, said FM band of frequencies being organized into a plurality of FM radio band signal strength masks, each of said FM radio band signal strength masks having a central portion and two sidelobe portions, the method comprising the steps of:

transmitting a discrete multi-tone digital FM band radio signal in parallel over a first plurality of sub-channels, said discrete multi-tone digital FM band radio signal representing a content of said digital sound, said first plurality of sub-channels representing a subset of available sub-channels within a first FM radio band signal strength mask of said FM radio band signal strength masks said available sub-channels being located in one of said central portion of said first FM radio signal strength mask that is unoccupied by an analog audio signal and at least one of said two sidelobe portions of said first FM radio signal strength mask that is non-overlapped by two immediately adjacent FM radio band signal strength masks of said plurality of FM radio band signal strength masks; and transmitting control information on a control signal over a control sub-channel, said control sub-channel representing a sub-channel of said available sub-channels that is different from said first plurality of sub-channels, the control information being transmitted as a continuous string of frames wherein each frame includes a signature identifying the frame as a portion of the control signal and control data to enable a receiver to identify the plurality of sub-channels used to carry the discrete multi-tone digital FM band radio signal.

\* \* \* \* \*